United States Patent [19]

Carroll

[11] Patent Number: 5,218,197
[45] Date of Patent: Jun. 8, 1993

[54] METHOD AND APPARATUS FOR THE NON-INVASIVE MEASUREMENT OF PRESSURE INSIDE PIPES USING A FIBER OPTIC INTERFEROMETER SENSOR

[75] Inventor: Gerard P. Carroll, Washington, D.C.

[73] Assignee: The United States of America as represented by the Secretary of the Navy, Washington, D.C.

[21] Appl. No.: 702,540

[22] Filed: May 20, 1991

[51] Int. Cl.⁵ ............................................. H01J 5/16
[52] U.S. Cl. ......................... 250/227.19; 250/227.16; 250/227.21; 356/35.5; 356/357
[58] Field of Search ...................... 250/227.16, 227.19, 250/227.21, 227.27, 227.14; 356/357–358, 35.5, 345; 73/800

[56] References Cited

U.S. PATENT DOCUMENTS

| | | | |
|---|---|---|---|
| 4,162,397 | 7/1979 | Bucaro et al. | |
| 4,238,856 | 12/1980 | Bucaro et al. | |
| 4,363,114 | 12/1982 | Bucaro et al. | |
| 4,418,981 | 12/1983 | Stowe | |
| 4,495,411 | 1/1985 | Rashleigh | 250/227.19 |
| 4,552,457 | 11/1985 | Giallorenzi et al. | 250/227.19 |
| 4,654,520 | 3/1987 | Griffiths | |
| 4,671,659 | 6/1987 | Rempt et al. | |
| 4,692,610 | 9/1987 | Szuchy | |
| 4,724,316 | 2/1989 | Morton | 250/227.14 |
| 4,812,014 | 3/1989 | Sawano et al. | 250/227.14 |
| 4,880,970 | 11/1989 | Jones | 250/227.16 |
| 4,929,050 | 5/1990 | Wilson | 250/227.19 |

FOREIGN PATENT DOCUMENTS 2086582 5/1982 United Kingdom.

OTHER PUBLICATIONS

Jackson, "Monomide Optical Fibre Interferometers for Precision Measurement", *Instrument Science and Technology*, No. 735/85/120981, pp. 981–1001, 1985.
Summerscales, "Embedded Optical Sensors in Fibre Reinforced Plastics", *Journal of Optical Sensors*, vol 1, No. 4, pp. 287–296, 1986.
Davis et al, *Fiberoptic Sensors Technology Handbook*, published by Dynamic Systems, Inc. McLean, Va., pp. 4-1 through 5-22, 1982.

*Primary Examiner*—David C. Nelms
*Assistant Examiner*—K. Shami
*Attorney, Agent, or Firm*—Howard Kaiser

[57] ABSTRACT

A method and apparatus for the non-invasive sensing of the pressure within a pipe (or other vessel) is disclosed. An optical source produces a first light beam. This first light beam is split between a first (reference) and a second (measurement) optical fiber. The second optical fiber is associated with the pipe such that circumferential displacements in the pipe, due to changes in internal pressure, result in corresponding displacements in the length of the second optical fiber. Length changes in the optical fibers result in variations in the phase of the light emerging therefrom. The phase difference between the light beams emitted from the first and second optical fibers is then determined and related to changes in the internal pressure of the pipe.

2 Claims, 2 Drawing Sheets

METHOD AND APPARATUS FOR THE NON-INVASIVE MEASUREMENT OF PRESSURE INSIDE PIPES USING A FIBER OPTIC INTERFEROMETER SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to the art of non-invasive measurement of the pressure inside pipes or other vessels. More specifically, this invention relates to a fiber optic interferometer used for detecting changes in the outer circumference of a pipe and thereby predicting the pressure inside that pipe.

(2) Description of the Known Art

It is often necessary or desirable to monitor the pressure of a fluid or gas flowing in an expansible pipe without destroying the integrity of the pipe. Known non-invasive methods include strain gauge sensors and piezoelectric sensors.

With strain gauge sensors, the pressure is measured by measuring the pipe wall expansion using a plurality of sensors positioned circumferentially around the pipe. The sensors used are typically strain gauges or force gauges. One variety of this class of sensors involves using two rigid beams which are clamped around the pipe perpendicular with its length. The beams are fixed spatially at one end, while a sensitive strain gauge is attached between the beams at the opposite end. In this manner, the beam lengths mechanically amplify any diametric size variations in the pipe such that they can be detected by the strain gauge.

A primary disadvantage of the strain gauge type sensors is that they sense local, diametric expansion rather than circumferential expansion. This makes them particularly vulnerable to errors introduced by structural vibrations of the pipe wall. The strain gauge sensors are sensitive to flexural wave, compressional wave, and torsional wave motions.

The second class of sensors employs piezoelectric transducers. A strip of piezoelectric film is wound around a pipe one or more times. Expansion of the pipe wall then results in a flexure of the piezoelectric element which causes the element to generate an electrical charge. The magnitude of this charge can then be related to changes in the pipe's internal pressure.

Since the piezoelectric film extends around the entire circumference of the pipe wall, the resultant charge output represents a circumferential average of the charges resulting from the local pipe wall deformations. Thus, the piezoelectric sensor has the advantage over the mechanical sensor in more completely discriminating against components of the pipe wall response resulting from axial and circumferential waves propagating thereon. However, since the piezoelectric element is sensitive to strains in all directions, it is susceptible to strain errors resulting from torsional and compressional pipe wall response.

The piezoelectric film sensor has several further disadvantages. First, the sensor responds only to dynamic or changing pressures. This is because the charge "bleeds off" of the piezoelectric device, making it unable to measure static pressures. Second, the piezoelectric film is especially sensitive to electromagnetic radiation, such that the desired signal may be masked by electrical noise. This sensitivity also requires that the piezoelectric film be carefully insulated from the pipe wall if the pipe is electrically conductive. Third, the piezoelectric material is temperature sensitive, and there is no simple method for correcting for its temperature variations. Fourth, piezoelectric material cannot be used in environments where the temperature is greater than 200° F.

It is towards overcoming the limitations of these known devices that the present invention is directed.

SUMMARY OF THE INVENTION

A method and apparatus for the non-invasive sensing of the pressure within a pipe (or other vessel) is disclosed. An optical source produces a first light beam. This first light beam is split between a first (reference) and a second (measurement) optical fiber. The second optical fiber is wrapped around the pipe such that circumferential displacements in the pipe, due to changes in internal pressure, result in corresponding displacements in the length of the second optical fiber.

Length changes in the second optical fiber result in variations in the phase of the light emerging therefrom. The phase difference between the light beams emitted from the first and second optical fibers is determined and related to changes in the internal pressure of the pipe.

While the preferred embodiment uses a Mach-Zehnder interferometer for sensing circumferential displacements of the pipe, other fiber optic technologies such as a Michelsen interferometer may be used.

It is an advantage of the present invention that a non-invasive pressure sensor has been developed which discriminates against all pipe wall vibration modes and measures only circumferential displacement which is related to internal pressure.

It is a further advantage of the present invention that the device is insensitive to electromagnetic radiation.

Yet another advantage of the present sensor is that it does not need to be insulated from the pipe wall.

It is another advantage of the present invention that ambient induced errors may be easily detected and eliminated using detection schemes typical for fiber optic sensors.

It is yet another advantage of the present invention that the sensor may be implemented for either analog or digital pressure sensing.

Still another advantage of this invention is that a sensor is produced that is useful for measuring both static and dynamic pressures.

DESCRIPTION OF THE PREFERRED EMBODIMENT

Figure 1:
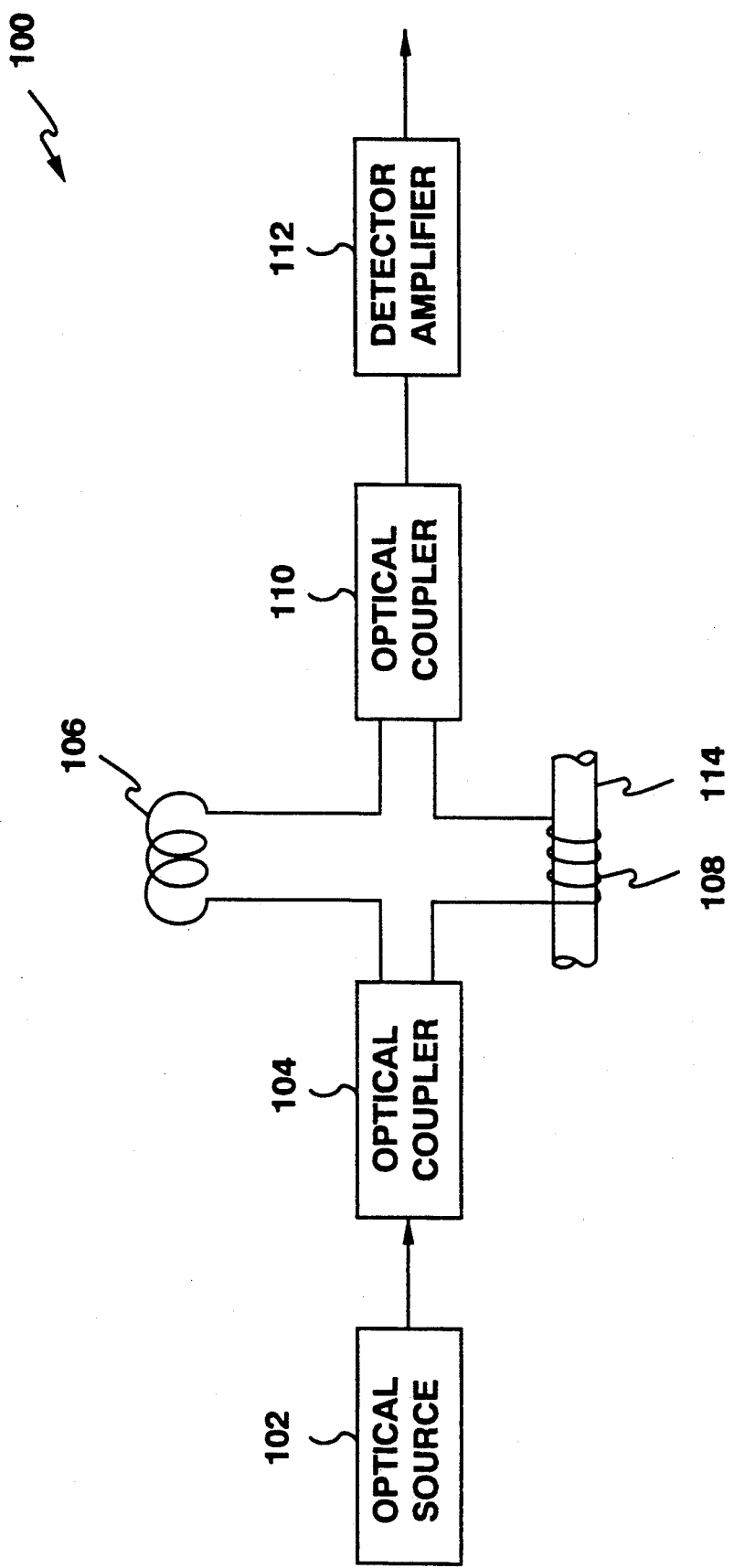
FIG. 1 is a block diagram of the apparatus of the present invention.

The preferred embodiment of the apparatus of the present invention uses a Mach-Zehnder interferometer. An interferometer sensor 100 shown in FIG. 1 includes an optical source 102, a first optical coupler 104, a pair of optical fibers (a reference fiber 106 and a measurement fiber 108), a second optical coupler and a detector/amplifier 112.

Optical source 102 is a laser which produces a light beam of frequency λ. The light beam is split equally between optical fibers 106 and 108 by first optical coupler 104. After traveling the length of optical fibers 106 and 108, the beams are recombined by second optical coupler 110. The combined beam is then detected by detector/amplifier 112.

Measurement fiber 108 is wrapped one or more times around a pipe 114 and fixedly attached to the surface thereof. Attachment can be accomplished using an adhesive. Changing pressures within pipe 114 will cause circumferential expansion or contraction of pipe 114. Because measurement fiber 108 is fixedly attached to the outer surface of pipe 114, the length of measurement fiber 108 will change in proportion to the circumference of pipe 114. Thus, expansion/contraction of pipe 114 will cause corresponding changes in the length of measurement fiber 108.

As the length of measurement fiber 108 changes, so too will the phase of the light beam arriving at optical coupler 110. It is upon detecting differences in the phase of the light beams arriving at the distal ends of optical fibers 106 and 108 that the present invention is based.

The phase difference cannot be detected directly because the frequency of light used in fiber optic applications is around $10^{14}$ Hz, and known photodetectors are not capable of responding to frequencies this high. Various detection techniques do, however, exist for measuring the optical path difference. These include passive homodyne, active homodyne, heterodyne and pseudoheterodyne. An additional advantage is that some of these techniques will inherently compensate for optical path length variations due to environmental effects, such as temperature. The preferred embodiment of this invention uses passive homodyne detection.

Light beams from optical fibers 106 and 108 are recombined using second optical coupler 110. This results in an amplitude modulated signal in which the amplitude is a direct function of the phase difference between the two beams. For example, if the light beams are in phase (i.e., vary only by an integer multiple of $2\pi$ radians, if at all), then they will constructively interfere, resulting in a light beam having an amplitude double that of the individual beams. At the other extreme, if the light beams are 180° out of phase, then they will destructively interfere and cancel one another, resulting in zero amplitude.

The interference pattern or modulated signal produced by second optical coupler 110 is demodulated by optical detector/amplifier 112. Detector/amplifier 112 then produces an output current which is directly proportional to the amplitude (intensity) of the light beam received from second optical coupler 110.

Figure 2:
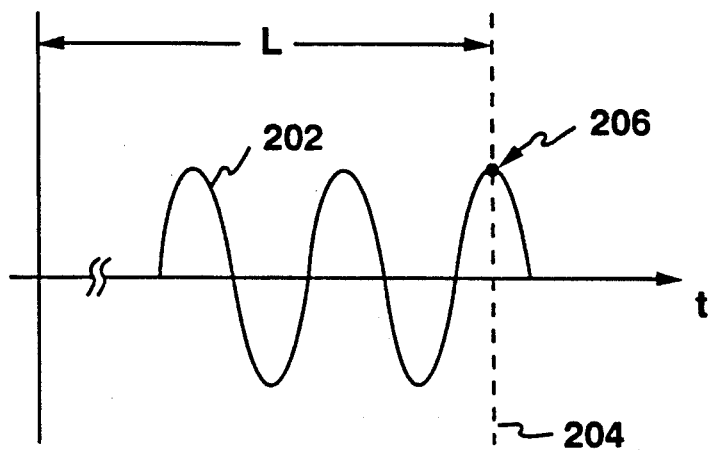
FIG. 2 and FIG. 3 are representative sine waves illustrating the phase shifting which occurs due to changing the length of optical fiber 108.

FIG. 2 shows a sine wave 202 which illustrates a representative amplitude and phase of a first light wave. A line 204 crosses sine wave 202 at point 206. Point 206 corresponds to the amplitude and phase of the light wave 202 as it would appear at optical coupler 110 after traveling through an optical fiber of length L.

Figure 3:
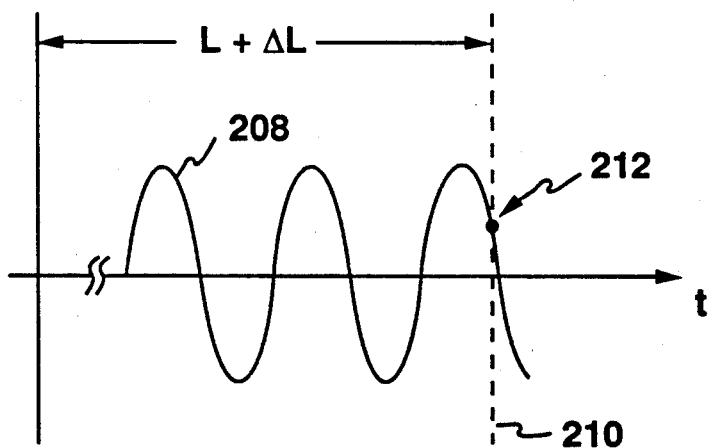

FIG. 3 shows a sine wave 208 which illustrates a representative amplitude and phase of a second light wave. A line 210 intersects light wave 208 at a point 212. Point 212 is representative of the amplitude and phase of light wave 208 as it would appear at optical coupler 110 after traveling through an optical fiber of length $L + \Delta L$. Note that $\Delta L$ of the optical fiber results in a phase difference, $\Delta \phi$, between light waves 202 and 208.

Although it is possible to construct an interferometer with path lengths such that the light arriving at optical coupler 110 is initially in phase (e.g., the optical path lengths of fibers 106 and 108 are related by the equation $L_1 = L_2 \pm 2\pi n$ radians, where n is an integer), this is typically not the practice in the art of fiber optic sensors. Instead, most interferometers are operated with an initial, arbitrary optical path difference. In this case, instead of measuring an absolute phase difference between the light beams, it is merely necessary to correlate an initially occurring phase difference with a $\Delta L$ of zero and to then calculate all phase changes with respect to this initial deviation.

A phase change ($\Delta \phi$) of a light wave through an optical fiber of original length L that has been stretched by a length $\Delta L$ is given by the following equation:

$$\Delta \phi = \frac{2\pi \cdot \eta_1 \cdot \Delta L}{\lambda_0} \tag{1}$$

where:
$\eta_1$ = the refractive index of the fiber core
$\lambda_0$ = the wave length of the light from source 102

The relationship between the pressure inside pipe 114 and a change in the phase of the light beams can then be determined by the formulae:

$$p = \frac{2 \cdot E \cdot t \cdot \Delta r}{r^2 \cdot (2 - v)} \tag{2}$$

where:
p = pressure within pipe
E = Young's Modulus
t = pipe wall thickness
v = Poisson's Ratio
r = radius of the pipe wall (at its outer surface)
and $$\Delta L = 2\pi \cdot N \cdot \Delta r \tag{3}$$

where: N = number of turns on pipe
Substituting equations (1) and (3) into (2) yields:

$$p = \frac{\lambda_0 \cdot E \cdot t \cdot \Delta \phi}{2\pi^2 \cdot \eta_1 \cdot N \cdot r^2 \cdot (2 - v)} \tag{4}$$

Note in equation (4) that N is in the denominator, making the sensitivity of sensor 100 directly related to the number of turns around the pipe.

While the present embodiment has been illustrated using a Mach-Zehnder interferometer, those skilled in the art of fiber optics will recognize that other interferometric devices, such as the Michelsen interferometer, could also be used. Operation of the Michelsen embodiment is similar to that of the Mach-Zehnder embodiment. However, in the Michelsen embodiment an end of each optical fiber is mirrored.

A light beam introduced into each fiber will propagate along the length of the fiber and be reflected from the mirrored end back along the length of the fiber. A beam splitter, such as a partially reflective mirror, can then be used to direct a portion of the reflected light beams to an optical detector for detection, as discussed above. After accounting for the fact that in the Michelsen embodiment the light traverses twice the distance as in the Mach-Zehnder embodiment, the relationship between the phase shift and the pressure in the pipe can be determined as set forth above.

It should be understood that those skilled in the art will recognize a variety of applications and appropriate modifications within the spirit of the invention and the scope of the claims.

What is claimed is:

1. A method for non-invasively determining the pressure within a pipe, comprising the steps of:

generating an original light beam using a laser;

splitting equally said original light beam into first and second split-off light beams, using an optical coupler;

providing for said first split-off light beam a first single mode optical fiber defining an optical reference path, said first single mode optical fiber being spaced away from said pipe;

adhesively fixedly attaching a second single mode optical fiber defining an optical measurement path, said second single mode optical fiber being helically wound once and substantially circumferentially around the circumference of said pipe, whereby circumferential displacement in said pipe results in substantially equal displacement in the length of said second single mode optical fiber, said circumferential displacement being equal to $2\pi$ times the radial displacement of said pipe as measured from the outer surface of the wall of said pipe;

directing said first split-off light beam to said optical reference path;

directing said second split-off light beam to said optical measurement path;

combining said first and second split-off light beams from said optical reference and optical measurement paths to form a recombined light beam, using an optical coupler;

detecting and amplifying said recombined light beam;

producing an electrical current which is proportional to the amplitude of said recombined light beam, said amplitude being a function of the phase difference between said first and second split-off light beams, said phase difference being a function of said displacement in the length of said second single mode optical fiber;

determining said phase difference between said first and second split-off light beams;

determining the wave length of said original light beam;

determining the thickness of said wall of said pipe;

determining the refractive index of the core of said second signal mode optical fiber; and determining the pressure within said pipe, based upon said phase difference, said wave length, said wall thickness and said refractive index.

2. A method for non-invasively determining the pressure within a pipe, comprising the steps of:

generating an original light beam using a laser;

splitting equally said original light beam into first and second split-off light beams, using an optical coupler;

providing for said first split-off light beam a first single mode optical fiber defining an optical reference path, said first single mode optical fiber being spaced away from said pipe;

adhesively fixedly attaching a second single mode optical fiber defining an optical measurement path, said second single mode optical fiber being helically would at least once and for each said winding substantially circumferentially around the circumference of said pipe, whereby for each said winding circumferential displacement in said pipe results in substantially equal displacement in the length of said second single mode optical fiber, said circumferential displacement being equal to $2\pi$ times the radial displacement of said pipe as measured from the outer surface of the wall of said pipe;

directing said first split-off light beam to said optical reference path;

directing said second split-off light beam to said optical measurement path;

combining said first and second split-off light beams from said optical reference and optical measurement paths to form a recombined light beam, using an optical coupler;

detecting and amplifying said recombined light beam;

producing an electrical current which is proportional to the amplitude of said recombined light beam, said amplitude being a function of the phase difference between said first and second split-off light beams, said phase difference being a function of said displacement in the length of said second single mode optical fiber;

determining said phase difference between said first and second split-off light beams;

determining the wave length of said original light beam;

determining the thickness of said wall of said pipe;

determining the refractive index of the core of said second single mode optical fiber; and determining the pressure within said pipe, based upon said phase difference, said wave length, said wall thickness and said refractive index.

* * * * *